A. O. WILLIAMS.
DIFFERENTIAL GEARING.
APPLICATION FILED JULY 26, 1915.

1,195,314.

Patented Aug. 22, 1916.
3 SHEETS—SHEET 3.

WITNESSES
INVENTOR
Alfred O. Williams
by William M. Cowan
Attorney

UNITED STATES PATENT OFFICE.

ALFRED O. WILLIAMS, OF DETROIT, MICHIGAN.

DIFFERENTIAL GEARING.

1,195,314.   Specification of Letters Patent.   Patented Aug. 22, 1916.

Application filed July 26, 1915. Serial No. 42,025.

*To all whom it may concern:*

Be it known that I, ALFRED O. WILLIAMS, a citizen of the United States, residing at Detroit, county of Wayne, State of Michigan, have invented a certain new and useful Improvement in Differential Gearing, and declare the following to be a full, clear, and exact description of the same, such as will enable others skilled in the art to which it appertains to make and use the same, reference being had to the accompanying drawings, which form a part of this specification.

This invention relates to differential gearing for motor vehicles, and has for its object an improved construction and arrangement of parts by which each traction wheel when running, and under equal tractile stress, receives the same actuation as the other, but when one wheel is subjected to less tractile force than the other, as when turning a corner or passing through a muddy pool, where the tires cannot properly take hold of the ground surface, each traction wheel receives its rotative actuation so independently of the other, as regards the possible intercommunication between them, that any tendency to "race" on the part of the wheel having the least traction, is avoided. Efficient differential operation is thus given, while the use of the ordinary thrust construction is made possible.

Figure 1:
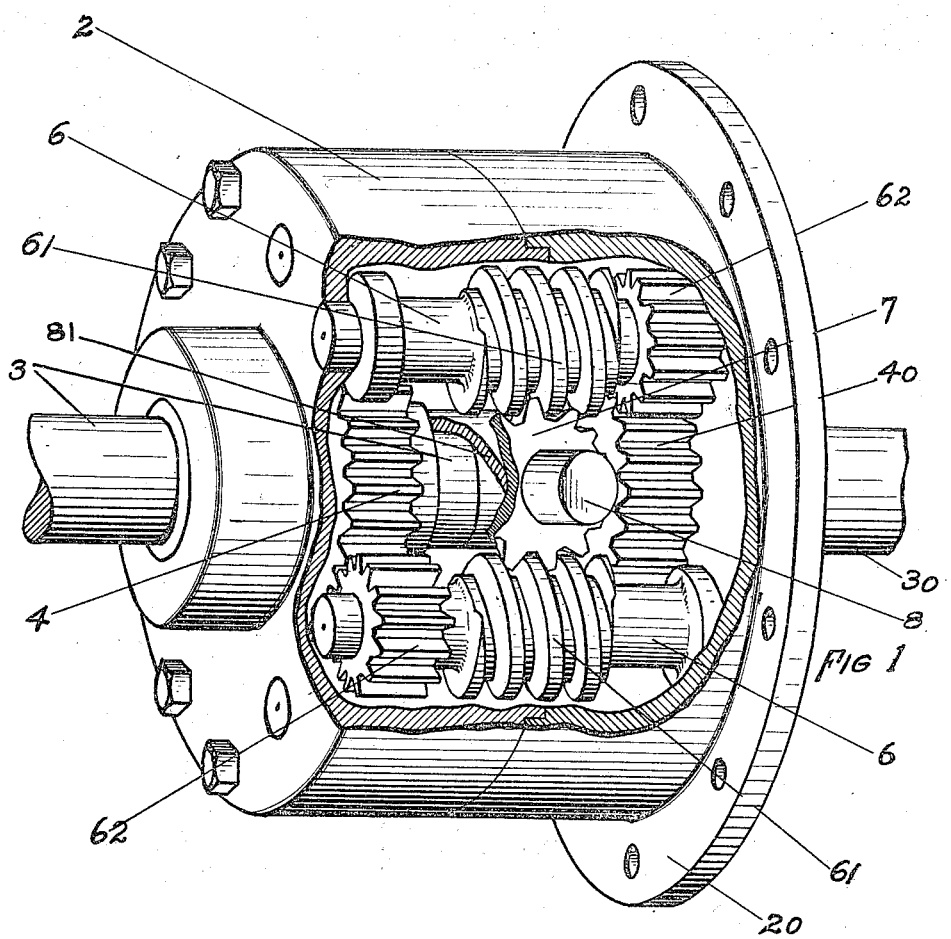
Figure 2:
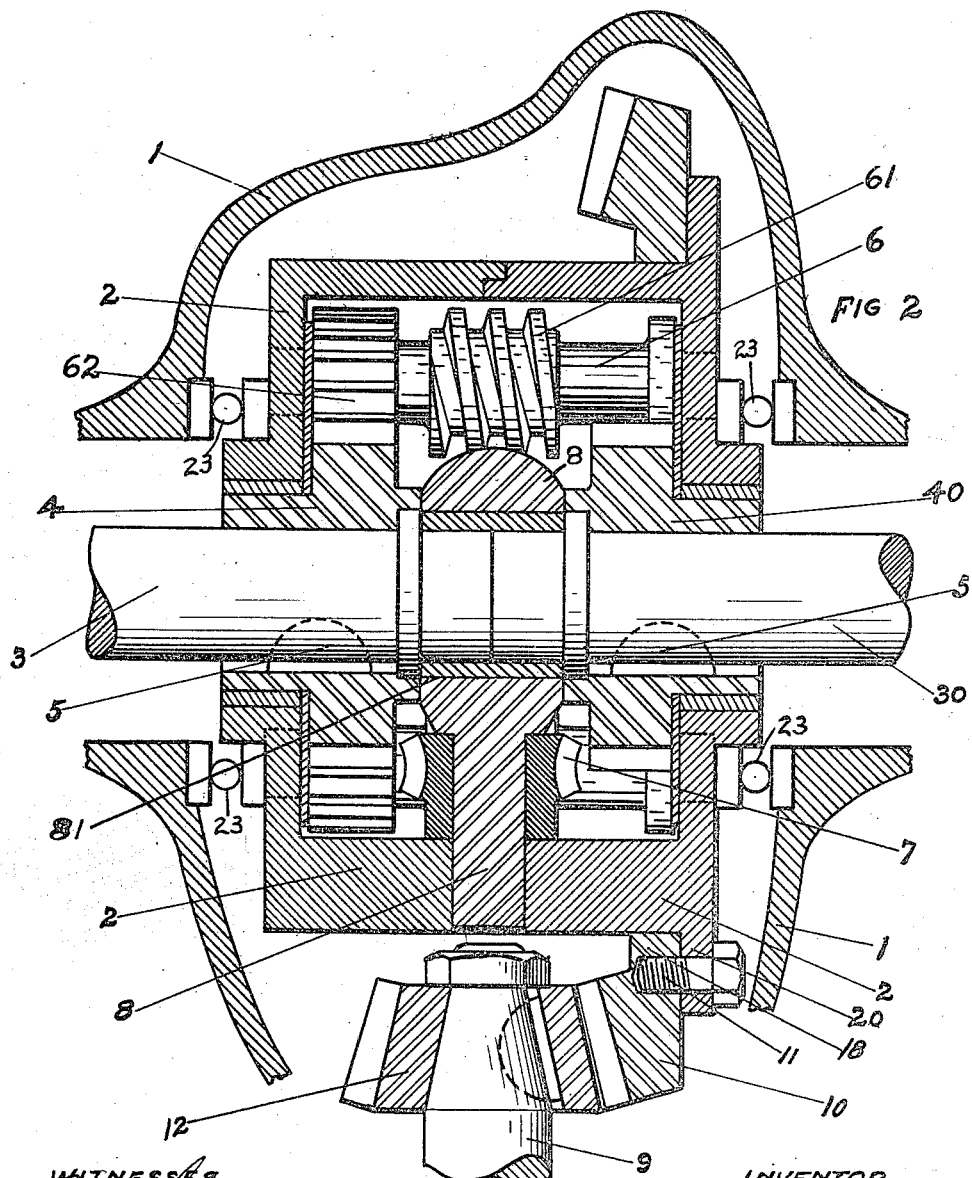
Figure 3:
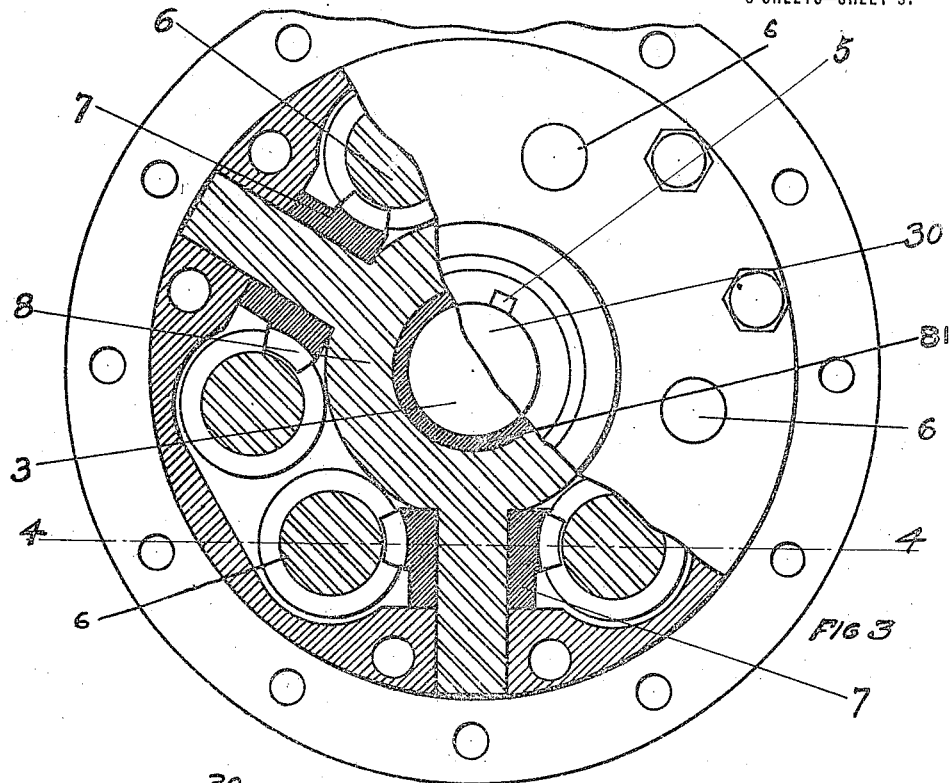
Figure 4:
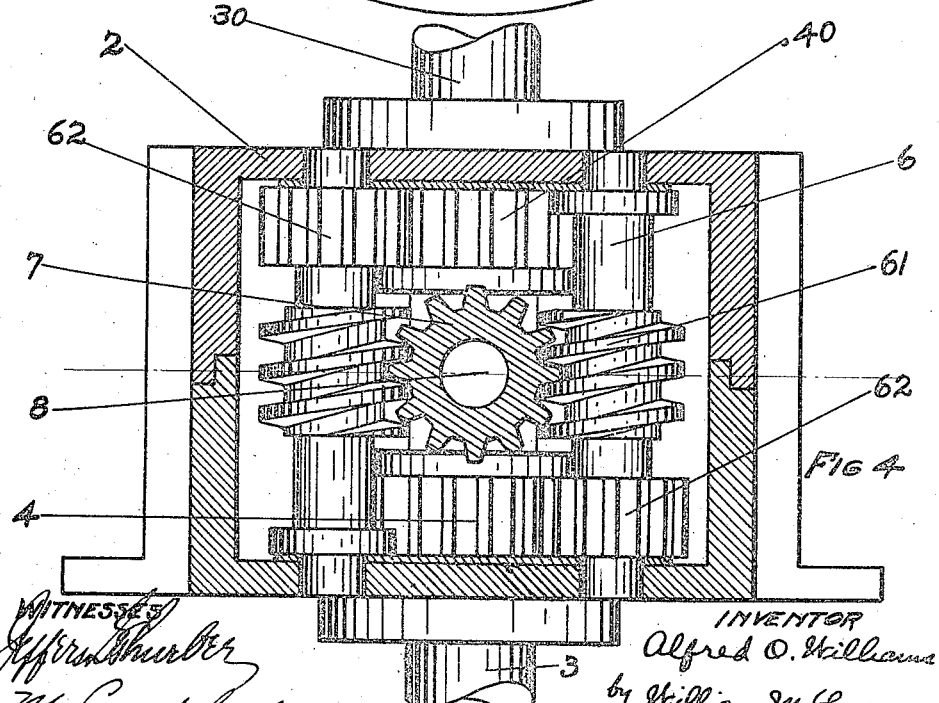

In the drawings:—Figure 1 is a perspective of the differential, with parts of the casing and interior gearing members broken away, to permit of the inter-relation of the several parts being inspected. Fig. 2 is a plan view, largely in section, of the meeting ends of the vehicle axles and of the gearing parts adjacent thereto. Fig. 3 is a side elevational view, partly in section, showing the relative positions of the several gear members and of the axles of the traction wheels. Fig. 4 is a partly sectional elevation, along the line 4—4 of Fig. 3, of the interior of the differential, designed to show especially the interengagement of the central detent worm gear wheel and of a pair of the worms.

3 and 30 represent the meeting ends of the axles of the traction wheels of a motor vehicle, which are rotatably journaled in an outer shell member 1 and an inner shell member 2. On the inner end of each of these shaft or axle members, gear wheels 4 and 40 are fixed to rotate therewith, by means of the keys 5. With their ends rotatably journaled in the inner shell 2 are a plurality of auxiliary shaft pieces 6, part of the length of each of which is in the form of a worm 61, and one end of each of which is formed, either integrally or by being keyed thereto, into a gear wheel 62, whose teeth intermesh with the teeth of one or the other of the axle gear wheels 4 or 40. These worm shafts 6, of which six are shown in the drawings, are arranged at equal radial distances from the central axis of the shafts 3 and 3ª, three of them having their gear wheels 62 intermeshing with the gear wheel 4 on the inner end of the shaft 3, while the remaining three, alternating therewith, have their gear wheels 62 intermeshing with the teeth of the gear wheel 40 on the inner end of the shaft 30. In the form shown in the drawings I have, as stated, shown a construction employing three pairs of such worm members, arranged hexagonally as viewed lengthwise of the shafts, but it is to be understood as clearly within the scope of my invention to use one, two, three or four pairs of such worm members, the adjacent and coöperating parts being modified accordingly, as hereinafter indicated.

A ring gear 10 is attached to the periphery of the inner shell 2 by means of bolts 11, which pass through registering holes in the flange 18 of the gear wheel 10 and the flange 20 of the inner shell member 2. The teeth of this ring gear are engaged by the teeth of the gear wheel 12, which is mounted on the end of the power shaft 9; this power shaft passes through a suitable aperture in the outer shell 1. Any desirable method of power transmission from the engine, such as an endless chain drive or a worm drive, could be employed instead of the shaft construction shown. Rotative motion being thus imparted to the inner shell 2 through the medium of the power shaft 9, this is in turn communicated to the shafts 3 and 30 by means of the interengagement of the several spur gear wheels 62 and the shaft gear wheels 4 and 40.

Rotatably engaging over the meeting ends of the shafts or axles 3 and 30 (being spaced therefrom if desired by the bushing 81) is a spider 8, which thus lies in a plane perpendicular to the axis of said shafts. On each of its three arms is rotatably journaled an irreversible detent wheel 7, whose teeth engage the worms whose threads intermesh therewith on either side. When the vehicle is running straight ahead, the differential is, of course, not brought into action at all, both traction wheels being under equal actuation, and all of the parts within the inner casing 2 rotating with it, and without relative movement as regards one another. When, however, one traction wheel rotates more rapidly than the other, as when turning a corner, it causes that trio of worm members 6 which is connected with the axle 3 or 30, as the case may be, to start to rotate accordingly, that is to say, its increased speed of rotation with respect to the inner casing 2 is exactly the same as the decreased speed of rotation of the other or inside traction wheel with respect to the casing 2, which as between the two traction wheels maintains a mean rotative speed.

When the vehicle is passing over a muddy stretch of road, and one wheel continues to have firm traction, while the other wheel has only mud or water for its tire to engage, the wheel having traction, that is, greater resistance at the time to its free rotation, would tend to slow up as regards the other traction wheel, causing its connected worms 62 to attempt to rotate which, however, is immediately stopped by the fact that the attempted rotation of the detent worm gears 7 is prevened by the pitch of those worms 62 which are connected with the other traction wheel. A relative difference in rotative speed as between the two wheels thus being rendered impossible by this locking of the parts, they must continue to rotate, even under these conditions, at the same rate. This prevents any relative motion between the traction wheel which has traction on the ground and the inner casing 2 by whose rotation alone the actuation of the other wheel can be effected, it being remembered that the casing 2 alone rotates, without relative movement of its contained parts, when both traction wheels are rotating equally, and not otherwise.

In an ordinary differential construction, differential action can result either from rotation of the differential casing and its power shaft, or from the wheels, due to their unequal traction. In my construction, on the other hand, differential action can occur only as a result of the covering of different linear distances by the traction wheels in the same length of time, or in any particular distance of vehicle movement.

What I claim is:

1. In a differential gearing, the combination of a casing, a pair of axially alined driven members rotatably journaled therein, a gear wheel mounted on the inner end of each of said driven members, a spider member engaging with its apertured central portion about the meeting ends of said driven members and with its arms extending radially toward the wall of the casing, a plurality of worms journaled in said casing in parallel relation to the axis of said driven members, said worms being arranged in pairs with each member thereof in operative engagement with a different gear wheel, irreversible worm gear wheels rotatably supported on the arms of said spider member in axially perpendicular position to said driven members and said worms, with whose teeth the threads of certain of said worms engage, and a power shaft operatively connected with said casing.

2. In a differential gearing, the combination of a casing member, a pair of axially alined traction axles journaled therein, gear wheels mounted on the adjacent ends of said traction axles, a plurality of worm members journaled in said casing coaxially with respect to said axles and radially equidistant therefrom, each worm member being operatively connected with one or the other of said gear wheels on the traction axles, a spider engaging about the adjacent ends of said traction axles in a plane perpendicular to the axis thereof, and irreversible detent worm gears each mounted on said spider in position to be engaged at diametrically opposite peripheral points by a pair of worms having diverse traction axle connections, being incapable of transmitting to either of its worms the rotative movement of the other.

3. A differential gearing, having, in combination with a pair of coaxially arranged driven axles, a casing member wherein their meeting ends are rotatably journaled, a spider member engaging about the meeting ends of said driven axles with its radially extending arms lying in a plane perpendicular to the axis of said driven axles, a plurality of worms rotatably mounted in said casing at equal radial distances about the meeting ends of said driven axles, half of said worms being operatively connected with one of said driven axles and the other half being similarly connected with the other of said driven axles, and an irreversible detent worm gear mounted on each of said spider arms in position to be engaged by a pair of said worms, each one operatively connected with a different driven axle at diametrically opposite peripheral points, whereby the rotative actuation communicated to it by either of its worms singularly is halted.

In testimony whereof I sign this specification in the presence of two witnesses.

ALFRED O. WILLIAMS.

Witnesses:
WILLIAM M. SWAN,
JEFFERSON G. THURBER.